US011457187B1

United States Patent
Zink et al.

(10) Patent No.: US 11,457,187 B1
(45) Date of Patent: Sep. 27, 2022

(54) SYSTEM AND METHOD FOR GENERATING VIDEO CONTENT WITH HUE-PRESERVATION IN VIRTUAL PRODUCTION

(71) Applicant: Warner Bros. Entertainment Inc., Burbank, CA (US)

(72) Inventors: Michael Zink, Altadena, CA (US); Michael Smith, Hermosa Beach, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 17/393,858

(22) Filed: Aug. 4, 2021

(51) Int. Cl.
*H04N 9/64* (2006.01)
*H04N 9/73* (2006.01)
(Continued)

(52) U.S. Cl.
CPC .............. *H04N 9/643* (2013.01); *H04N 9/67* (2013.01); *H04N 9/73* (2013.01); *H04N 19/186* (2014.11)

(58) Field of Classification Search
CPC .......... H04N 19/186; H04N 9/67; H04N 9/68; H04N 9/64; H04N 9/73; H04N 9/74; H04N 9/76; H04N 9/75; H04N 9/69; H04N 9/643; G09G 2340/06; G09G 5/02
USPC ....... 348/654, 586, 587, 590–592, 645, 649, 348/650, 674, 675, 700, 703; 345/590, 345/591, 640
See application file for complete search history.

(56) References Cited

U.S. PATENT DOCUMENTS 8,611,654 B2 * 12/2013 Yadav ................. H04N 1/6027
    348/645
8,860,747 B2    10/2014 Bhaskaran et al.
(Continued)

FOREIGN PATENT DOCUMENTS

CN      204023218 A    9/2014
EP        3314882 B1    7/2019

OTHER PUBLICATIONS

Burke et al., "Color Volume and Hue-Preservation in HDR Tone Mapping," Technical Paper, SMPTE Motion Imaging Journal, May 2020, 6 pages.
(Continued)

*Primary Examiner* — Sherrie Hsia
(74) *Attorney, Agent, or Firm* — Chip Law Group

(57) ABSTRACT

A system is provided for generating video content with hue-preservation in virtual production. A processor determines data in a scene-based encoding format based on raw data received in a pre-defined format. The raw data includes a computer-generated background rendered on a rendering panel and a foreground object. Based on the data in the scene-based encoding format, scene linear data is determined. A saturation of the scene linear data is controlled when a first color gamut corresponding to the pre-defined format is mapped to a second color gamut corresponding to a display-based encoding color space. Based on the scene linear data, a standard dynamic range (SDR) video content in the display-based encoding color space is determined. Hue of the SDR video content is preserved, when the rendering panel is in-focus or out-of-focus, based on a scaling factor that is applied to three primary color values that describe the first color gamut.

20 Claims, 8 Drawing Sheets

(51) Int. Cl.
*H04N 9/67* (2006.01)
*H04N 19/186* (2014.01)

(56) References Cited

U.S. PATENT DOCUMENTS

| | | |
|---|---|---|
| 8,860,751 B2 | 10/2014 | Sullivan et al. |
| 2014/0253545 A1 | 9/2014 | Sullivan et al. |

OTHER PUBLICATIONS

Chuang et al., "Hue-Preserving Color Blending," IEEE Computer Society, and Torsten Möller, Member, IEEE, 2009, 8 pages.
Mackiewicz et al., "Method for hue plane preserving color correction," Journal of the Optical Society of America, vol. 33, No. 11, Nov. 2016, 12 pages.
Nikolova et al., "Fast Hue and Range preserving Histogram Specification. Theory and New Algorithms for Color Image Enhancement," 2013. hal-00871144v1, 22 pages.
Pouli et al., "Color Management for VR Production," Proceedings of the Virtual Reality International Conference—Laval Virtual, Apr. 2018, 6 pages.
Demos et al., "Core Color Rendering Algorithms for High Dynamic Range Display," SMPTE Motion Imaging Journal, Oct. 2018, 9 pages.

\* cited by examiner

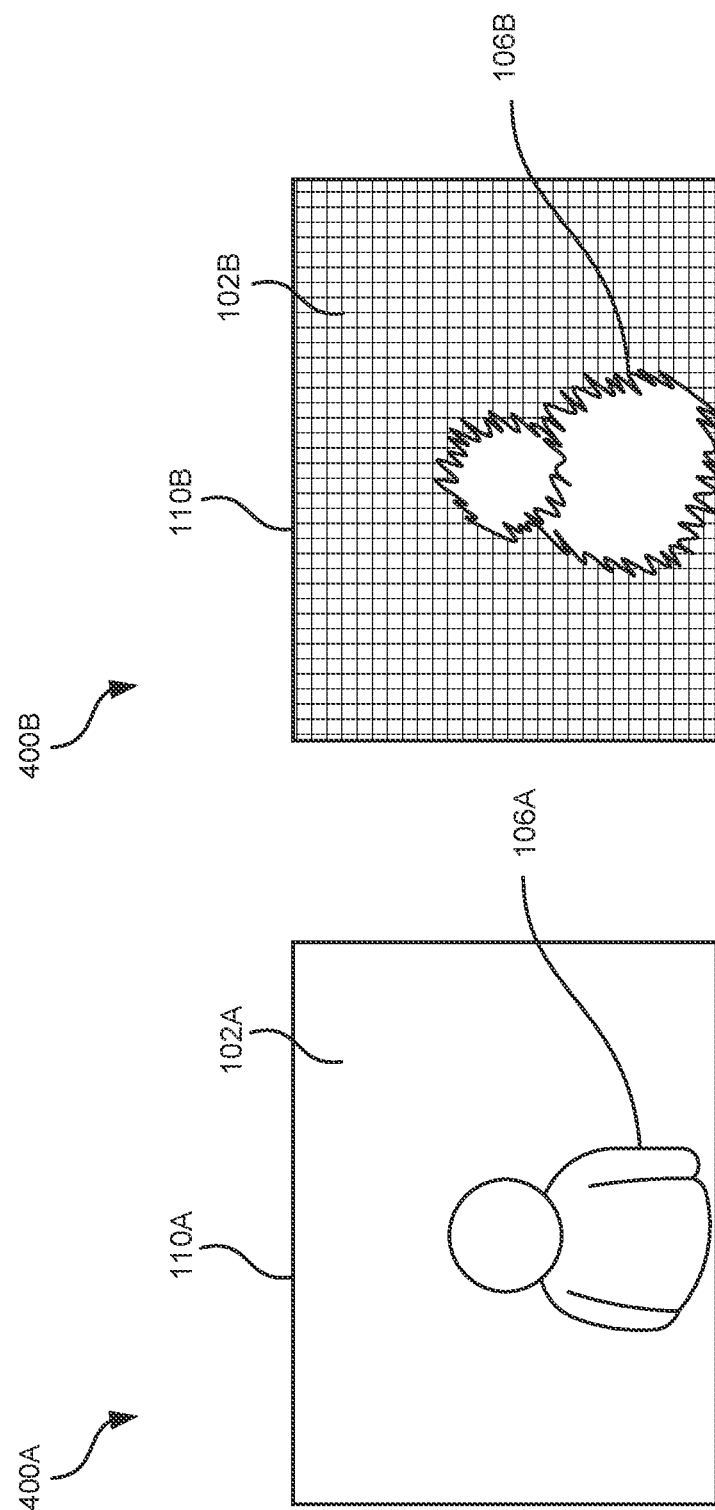

SYSTEM AND METHOD FOR GENERATING VIDEO CONTENT WITH HUE-PRESERVATION IN VIRTUAL PRODUCTION

CROSS-REFERENCE TO RELATED APPLICATIONS/INCORPORATION BY REFERENCE

None.

FIELD

Various embodiments of the disclosure relate to generating video content in virtual production. More specifically, various embodiments of the disclosure relate to generating video content with hue-preservation in virtual production.

BACKGROUND

Due to recent advancements in virtual production technology, a variety of new hardware devices and software applications are gaining popularity that provide a more agile and less linear workflow for how a video, such as a motion picture, an episodic television show, a live broadcast or an esports content, is produced. The new hardware devices and software applications in virtual production combine virtual and augmented reality with visual effects (VFX), computer-generated imagery (CGI) and game-engine technologies in real-time to enable a production crew to see the scenes unfold as they are composed and captured on set.

In accordance with a legacy motion picture workflow, for static scenes without moving cameras, a "matte-painting" may be used which was a very large physical painting or large photographic reproduction of a static scene that was part of the background that appeared behind the actors within the scene. However, such legacy motion picture workflow was cumbersome, time-consuming, and involved high costs.

In accordance with an existing VFX workflow, virtual sets may be added to images captured with actors in front of green-screen or blue-screen technologies after the scene is captured. However, unwanted hues and a lack of realistic reflection from surrounding scenery, and unbalanced lighting or matching of one or more color components in foreground objects with the background green-screen (or blue screen) in such workflows may compromise on high quality results and realistic visual effects. Further, high production cost in terms of time and effort in such workflows may not be desirable.

In accordance with another existing workflow, virtual sets may be added "in-camera" using front-projection or rear-projection display technology which may show moving or dynamic images that change across multiple frames of a shot. In such workflows, common camera rendering color pipelines, for example a rendering color pipeline described for ARRI™ cameras documented in SMPTE RDD 31, may be used to render images in virtual production. However, rendering transforms in such rendering color pipelines do not preserve hue. For example, when using a rendering transform that is not hue-preserving, the average hue of the background shown on the LED computer-generated background display units may be different, for example blue and cyan, depending on whether the rendering panel is in-focus or out-of-focus. Thus, such workflows may end up generating surprising, undesirable, and/or non-intuitive results, thereby failing to provide a natural and seamless viewing experience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for generating video content with hue-preservation in virtual production, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 4A and 4B illustrate two exemplary scenarios associated with generation of video content with hue-preservation in virtual production by the production server of FIG. 1C, in accordance with an exemplary embodiment of the disclosure.

DETAILED DESCRIPTION OF THE DISCLOSURE

Certain embodiments of the disclosure may be found in a method and system for generating video content with hue-preservation in virtual production. Various embodiments of the disclosure provide a method and system provides hue-preserving video content generation and rendering in virtual production. During post production, for hue-preservation, a scaling factor is applied to three primary color values that describe the camera-specific color gamut, which is generally a wide color gamut with significant saturation. For desaturation, such camera-specific color gamut is remapped to display-specific color gamut, which is comparatively a narrower color gamut, using a gamut-mapping process. Accordingly, the output video signal is more intuitive and provides a natural and seamless viewing experience irrespective of the fact whether the rendering panel is in-focus or out-of-focus.

In accordance with various embodiments of the disclosure, a system is provided for generating video content with hue-preservation in virtual production. A processor in a production server may be configured to determine data in a scene-based encoding format based on raw data received in a pre-defined format. The raw data may include a computer-generated background rendered on the rendering panel and the foreground object. The processor in the production server may be further configured to determine scene linear data based on the data in the scene-based encoding format. The processor in the production server may be further configured to control a saturation of the scene linear data when a first color gamut corresponding to the pre-defined format is mapped to a second color gamut corresponding to a display-based encoding color space. The first color gamut may be wider than the second color gamut. The processor in the production server may be further configured to determine a standard dynamic range (SDR) video content in the display-based encoding color space based on the scene linear data. The hue of the SDR video content is preserved, when the rendering panel is in-focus or out-of-focus, based on a scaling factor that is applied to three primary color values that describe the first color gamut.

Figure 1A:
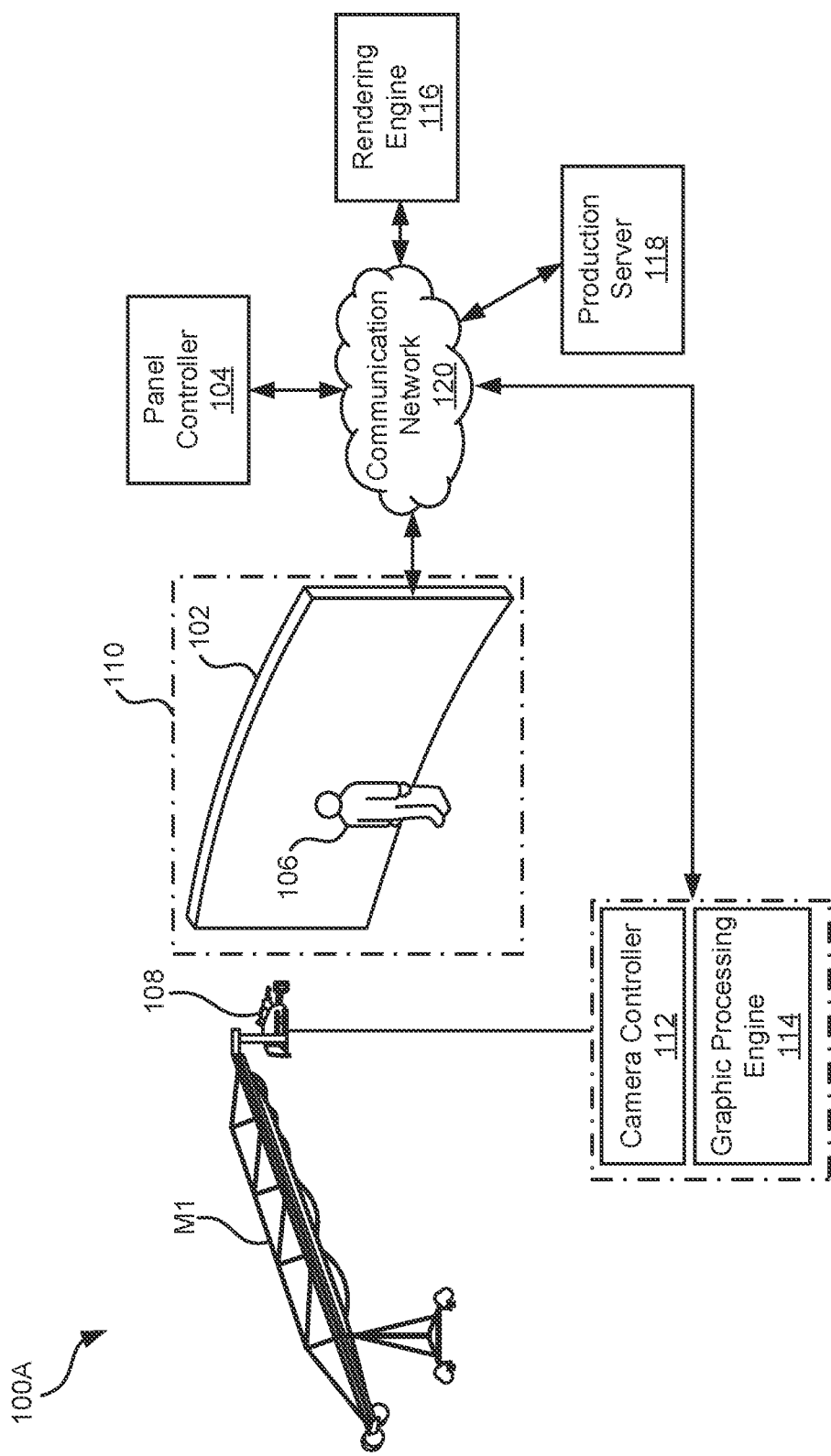
FIG. 1A is a schematic diagram illustrating an exemplary system for generating video content with hue-preservation in virtual production, in accordance with exemplary embodiments of the disclosure.

FIG. 1A is a schematic diagram illustrating an exemplary system for generating video content with hue-preservation in virtual production, in accordance with exemplary embodiments of the disclosure. Referring to FIG. 1A, there is shown an exemplary system 100A that includes a rendering panel 102, a panel controller 104, a foreground object 106, a first video camera 108, a scene 110, a camera controller 112, a graphic processing engine 114, a rendering engine 116, a production server 118, and a communication network 120. It may be noted that the number of components shown in exemplary system 100A is merely illustrative and should not be construed to be limiting. Notwithstanding, a typical feature film or other studio production system will typically include larger number of components than illustrated, without deviation from the scope of the disclosure.

In some embodiments, one or more components may be integrated with each other to form an integrated system. For example, the camera controller 112 and the graphic processing engine 114 may be integrated with the first video camera 108 to form an integrated system. In other embodiments, as shown, the one or more components may be distinct from each other. Other separation and/or combination of the various components of the exemplary system 100A illustrated in FIG. 1A may be done without departing from the spirit and scope of the various embodiments of the disclosure. Notwithstanding, the conventional components, such as network interfaces, security mechanisms, load balancers, failover servers, management, and network operations consoles, are not shown to not obscure the details of the system in the present disclosure.

The rendering panel 102 may correspond to an LED wall, also referred to as an LED backdrop or an LED panel in virtual production. The rendering panel 102 includes a display surface with individually addressable pixels collectively rendering a virtual background, i.e. a computer-generated background.

In accordance with an embodiment, the display surface of the rendering panel 102 may comprise multiple LED display units that may exhibit color shift and/or shift in brightness dependent on viewing angle. The color shift and/or shift in brightness (due to dependency on the viewing angle) in the light output from the multiple LED display units may degrade the images captured by the first video camera 108. For example, if the first video camera 108 is capturing the rendered scene from an off-axis position (e.g., greater than ±45 degrees from a normal to the LED display unit), the color and/or brightness of various portions of the rendered scene may be different from the color/brightness of the generated scene.

Each LED element in an LED display unit contains multiple primaries representing wavelengths corresponding to red, green, and blue wavelengths of light. In certain embodiments, other types of primaries, for example white, cyan, yellow or amber, may also be used within each LED element corresponding to each pixel, resulting in more than three primaries per pixel that may lead to displays that have wider reproduction color gamut or LED elements having a less peaky spectrum that may improve color reproduction when the light from the LED elements is used to replace traditional set lighting elements, such as key and fill lights.

In accordance with an embodiment, the rendering panel 102 may include additional LED lights, separate from the display surface, that may light a performance area (where the scene 110 is shot) and create desired lighting effects. In accordance with another embodiment, simulated lights located on the display surface may be selected to achieve the desired lighting effect. In such embodiments, the rendering panel 102 may be controlled by the panel controller 104, communicatively coupled via the communication network 120. Alternatively, the rendering panel 102 may include a suitable electronic display screen capable of controlling the individual pixels, pixel clusters, and/or the additional (and/or the simulated) LED lights.

It may be noted that the rendering panel 102 is illustrated as a single vertical LED wall in the exemplary system 100A illustrated in FIG. 1A. However, in other embodiments, not shown here, the single vertical LED wall may be extended to include horizontal and/or inclined surfaces, for example covering the floor, ceiling, and/or side walls by joining panels to completely or partially enclose a set in a facility, such as a production studio, a movie set, or a television set, and coordinating display on the panels using the panel controller 104.

The panel controller 104 may correspond to a combination of hardware and software (including applets), used to control the rendering panel 102. The panel controller 104 may provide an intuitive graphic interface and clear controls for quick and easy setup of the rendering panel 102 to create various desired lighting effects. The panel controller 104 may be operated locally or remotely for simultaneously controlling multiple LED processors installed at the rendering panel 102. In accordance with an embodiment, once each pixel is calibrated, the panel controller 104 may be programmed to accept an input from the camera controller 112 comprising location and orientation data for the one or more cameras, or equivalent data, enabling computation of the viewing angle for each pixel in the field-of-view (FOV) of each of the one or more video cameras, such as the first video camera 108.

The foreground object 106 may correspond to a living being, such as an actor or a performer, or a non-living being, such as a prop, that may perform in front of the rendering panel 102 while a suitable still image or video is rendered on the display surface of the rendering panel 102. It may be noted that for simplicity there is shown only one foreground object 106 in the exemplary system 100A illustrated in FIG. 1A, which should not be construed to be limiting. In accordance with various exemplary scenarios, the exemplary system 100A may include multiple foreground objects without deviation from the scope of the disclosure.

The first video camera 108 may correspond to an image or video capturing device that may be aimed towards rendering panel 102 to capture the foreground object 106, such as an actor holding a prop, as well as the virtual background rendered at the rendering panel 102. In accordance with an embodiment, the first video camera 108 may capture a view of performance area from a single perspective. In an embodiment, the first video camera 108 may be stationary, while in another embodiment, the first video camera 108 may be mounted on a crane camera mount M1 and on a track that may move the first video camera 108 during the performance to capture the scene 110.

In accordance with an embodiment, one or more sensors may be used to determine the position and orientation of the first video camera 108. For example, GPS based sensors (not shown) may determine position within or relative to a performance area. Based on the orientation and movement (and other attributes, such as lens aperture and focal length) of the first video camera 108, the rendering engine 116 may adjust the virtual background rendered at the rendering panel 102 in real-time or at interactive frame rates to correspond to orientation and position of the first video camera 108. In accordance with an embodiment, the first video camera 108 may be controlled by the camera controller 112.

In accordance with an embodiment, the resolution of the first video camera 108 may be greater than the resolution of the rendering panel 102. However, because the rendering panel 102 is usually large in size, the pixel pitch, which is a spacing between two LED elements in the rendering panel 102, is also large in comparison to the resolution of the video cameras. In case the LED elements in the rendering panel 102 and cabling were cheaper, the density of the LED elements may be higher. In an exemplary configuration, an ARRI™ ALEXA LF camera with a 125 mm lens at a pre-defined distance from an exemplary rendering panel, such as Roe Black Pearl 2-2.8 mm pixel pitch, may result in an image captured by the ARRI™ ALEXA LF camera in which the full frame has a resolution of 4448×3096 pixels, but area of the exemplary rendering panel, such as Roe Black Pearl 2-2.8 mm pixel pitch, being captured has about 10:1 camera. The pixel density ratio of the exemplary rendering panel corresponds to an area of LED elements that is made up of an array of 445×310 LED elements in a rectangular grid. In one case, the ARRI™ ALEXA LF camera may capture more LED elements with fixed focal length lens when moved further from the exemplary rendering panel. In another case, the ARRI™ ALEXA LF camera may capture fewer LED elements when moved closer to the exemplary rendering panel.

In accordance with an embodiment, as the lens focus of the of the first video camera 108 is adjusted to a focal distance in front of the rendering panel 102, the foreground object 106 in the scene 110 is in focus while the LED elements of the rendering panel 102 start going out-of-focus. If the same image is shown on the rendering panel 102 while the first video camera 108 is in and out-of-focus, the total amount of light emitted from the rendering panel 102 does not change but the first video camera 108 captures the light differently. For example, the in-focus LED element is captured with pixel value 9000 and the space between LED elements is captured with pixel value 1000. When the rendering panel 102 is out-of-focus, all the captured camera pixel values corresponding to the same area on the rendering panel 102 will have the same average value of (9000+1000)/2=5000.

Various non-limiting examples of the first video camera 108 may include high resolution cameras, such as ARRI-FLEX D-20, D-21 and ALEXA, Sony CineAlta(F) Series, Blackmagic Cinema Camera, RED ONE, Panavisions Genesis, Silicon Imaging SI-2K, Thomson Viper, Vision Research Phantom, IMAX 3D camera based on two Vision Research Phantom cores, Weisscam HS-1 and HS-2, GS Vitec noX, and the Fusion Camera System.

It may be noted that the exemplary system 100A illustrated in FIG. 1A illustrates only one video camera for exemplary purposes and should not be construed to limit the scope of the disclosure. The exemplary system 100A may include more than one video camera without deviating from the scope of the disclosure. The number of video cameras in the exemplary system 100A may vary depending on the type of cameras, desired image resolution, and the extent of the field of play to be encompassed by the FOV of the cameras.

The scene 110 may correspond to a section of a motion picture in a single location and continuous time. The scene 110 may be made up of a series of shots, which may be each a set of contiguous frames from one or more cameras, such as the first video camera 108, from varying angles. To shoot the scene 110 in the exemplary system 100, the foreground object 106, such as an actor, may act in front of the rendering panel 102 while a suitable still image or video for the scene 110 may be rendered on the display surface of the rendering panel 102. In accordance with an embodiment, the scene 110 captured by the first video camera 108 may differ in brightness (sometimes called luminosity) and color from the scene generated by a virtual data generator.

The camera controller 112 may comprise suitable logic, circuitry, and interfaces that may be configured to receive position of the rendering panel 102 relative to the first video camera 108. Further, the camera controller 112 may receive the orientation of the first video camera 108 relative to the rendering panel 102 from one or more sensors or measured directly using rotational encoders on a tripod or crane camera mount. The one or more sensors may correspond to inertial sensors, positioning system (e.g., GPS) receivers, with other camera tracking and pose methods (e.g. Valve Vive tracker, Mo-Sys VP Pro XR). Based on such data, the camera controller 112 may provide an input to other components, such as the panel controller 104 and the rendering engine 116.

The graphic processing engine 114 may comprise suitable logic, circuitry, and interfaces that may be configured to fuse static images, videos, and/or computer modeling/animation data displayed by the rendering engine 116 at the rendering panel 102 with video capture of the foreground object 106 in the scene 110 to show all the elements in an immersive fashion. In such a fusion, the virtual background may be rendered from the perspective of the first video camera 108 or other device that is used to capture the scene 110. Hence, the graphic processing engine 114 may receive input parameters from the camera controller 112 along with distances of real and virtual objects relative to the first video camera 108 to resolve occlusion.

The rendering engine 116 may comprise suitable logic, circuitry, and interfaces that may be configured to render static images and videos corresponding to 3D data at interactive frame rates (such as, 24, 48, 72, 96, or more frames per second). In accordance with an embodiment, the rendering engine 116 may render video or static images from a 3D model, typically in real-time while shooting the scene 110 by the exemplary system 100A using the first video camera 108. In accordance with another embodiment, the rendering engine 116 may render computer modeling/animation data at the rendering panel 102. The computer modeling/animation data may be arranged from various modeling/animation sub-systems (not shown).

In accordance with yet another embodiment, a real-time game rendering engine may be implemented as the rendering engine 116 that may load a virtual environment for display on the rendering panel 102 surrounding the performance area where the scene 110 is shot. In accordance with such embodiment, the real-time game rendering engine may load virtual assets into the virtual environment. The real-time game rendering engine may then permit the virtual assets to interact or move according to simulated physics information stored by the real-time game rendering engine. The real-time game rendering engine may also be responsive to the position, orientation, and motion of the first video camera 108 received from the camera controller 112. For example, a camera orientation and position of the first video camera 108 may be input to the real-time game rendering engine during a dolly shot in which the background of the scene 110 is viewed from different camera positions as the first video camera 108 moves across the set. The real-time game rendering engine may be configured to update the rendered view of the background from the camera position as it updates from frame to frame. The image of the background may be then projected on a virtual surface within the real-time game rendering engine corresponding to the physical layout of the rendering panel 102 on the physical set. The resulting projected image may be displayed on the rendering panel 102 and then filmed by the actual camera, such as the first video camera 108, on set. The resulting projected image may be displayed with parallax effect and field of view of the virtual background may be correctly aligned for the dynamically adjusted camera position and orientation. The real-time game rendering engine may also adapt the displayed image, so it corresponds to real-time adjustments to focal length of the camera lens.

The production server 118 may comprise suitable logic, circuitry, and interfaces that may be configured to perform post-production functionalities, such as applying visual effects, sound, editing, color grading, and hue-preservation on the video footage (or output video) generated by the first video camera 108. In an embodiment, the production server 118 may be disposed remotely from the first video camera 108, such as at a production facility of a television network producing sporting events for broadcast. The production server 118, which may comprise a variety of production applications operating over the communication network 120, may access the output video under control of various production staff controlling the production process via multiple access terminals (not shown).

The communication network 120 may be any kind of network, or a combination of various networks, and it is shown illustrating exemplary communication that may occur between the various servers and sub-systems of the exemplary system 100, such as the rendering panel 102, the panel controller 104, the foreground object 106, the first video camera 108, the camera controller 112, the graphic processing engine 114, the rendering engine 116, and the production server 118. The communication network 120 may include a communication channel that may be a secured link using the Internet (for example, a virtual private network (VPN)), an unsecured link using the Internet, a dedicated communication link, or any other communication channel capable of conveying data described herein (e.g. any combination of cables, satellite, cellular, and Wi-Fi communication links). In accordance with an embodiment, transmit/receive interfaces in the various servers and sub-systems of the exemplary system 100, may enable wireless communication between each other via a wireless coupling, via the communication network 120. The transmit/receive component may operate using any suitable high-bandwidth wireless technology or protocol, including, for example, cellular telephone technologies, such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol, such as Institute of Electrical and Electronics Engineers (IEEE) 802.11.

In operation, the camera controller 112 may provide location and orientation data for the one or more cameras, such as the first video camera 108 to the rendering engine 116 so that the rendering engine 116 is responsive to the position, orientation, and motion of the first video camera 108. Accordingly, rendering engine 116 may render static images and videos corresponding to 3D data at interactive frame rates (such as, 24, 48, 72, 96, or more frames per second), a 3D model in real-time, computer modeling/animation data, or a virtual environment (loaded by a real-time game rendering engine) at the rendering panel 102. The panel controller 104 may receive the relative position and orientation data to compute the unique aspect for each pixel within the FOV of the first video camera 108. The panel controller 104 may further enable computation of the viewing angle for each pixel in the one or more video cameras, such as the first video camera 108. The panel controller 104 may further control the LED lights in the rendering panel 102 to generate the desired lighting effect. Accordingly, the first video camera 108 may capture the scene 110 that simultaneously comprises the virtual background, i.e. a computer-generated background rendered at the rendering panel 102, and/or the foreground object 106 on the set resulting in so called "in-camera visual effect". Such captured scene may be high quality raw data in a pre-defined format in accordance with the type of the first video camera 108. The graphic processing engine 114 may fuse static images, videos, computer modeling/animation data, an/or the visual environment displayed by the rendering engine 116 at the rendering panel 102 with live video capture of the foreground object 106 in the scene 110 to show all the elements in an immersive fashion.

The production server 118 may receive the raw data in the pre-defined format from the graphic processing engine 114, via the communication network 120. The production server 118 may determine data in a scene-based encoding format based on the raw data received in the pre-defined format and determine scene linear data based on the data in the scene-based encoding format. The production server 118 may control the saturation of the scene linear data when the first color gamut, such as ARRI™ Wide Gamut (AWG), corresponding to the pre-defined format is mapped to the second color gamut corresponding to a display-based encoding color space, such as Rec 709 or Rec 2020 color spaces. In accordance with an embodiment, the production server 118 may determine SDR video content in the display-based encoding color space based on the scene linear data. In such embodiment, hue of the SDR video content is preserved, when the rendering panel 102 is in-focus or out-of-focus, based on a scaling factor that is applied to three primary color values that describe the first color gamut, i.e. AWG. In accordance with another embodiment, a high-dynamic range (HDR) display system may be targeted instead of an SDR display system that includes the SDR video display.

Figure 1B:
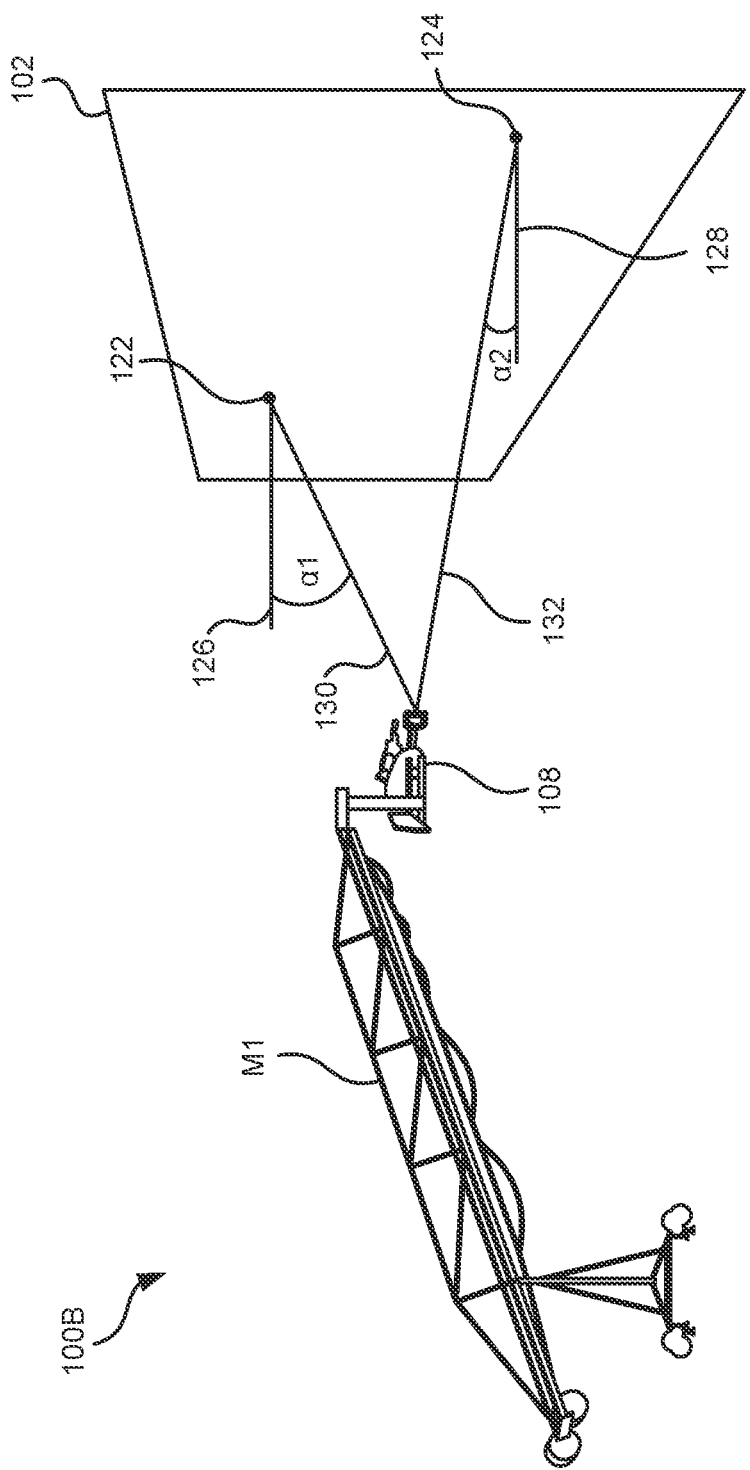
FIG. 1B is a schematic diagram illustrating various geometrical aspects of a camera aperture relative to pixels of a rendering panel, in accordance with exemplary embodiments of the disclosure.

FIG. 1B is a schematic diagram illustrating various geometrical aspects of a camera aperture relative to pixels of a rendering panel, in accordance with exemplary embodiments of the disclosure. In other words, the schematic diagram 100B illustrated in FIG. 1B indicates geometrical relationships that are relevant to the visual effect caused by using the rendering panel 102 as a backdrop in virtual production. For example, a first point 122 and a second point 124 are two the spaced-apart points of the rendering panel 102. Each of the first point 122 and the second point 124 corresponds to respective pixels of the rendering panel 102 with respective surface normals 126 and 128. The surface normals 126 and 128 indicate "on-axis" direction of maximal illumination of the respective pixels. A first ray 130 is casted from the aperture of the first video camera 108 to the first point 122. Similarly, a second ray 132 is casted from the aperture of the first video camera 108 to the second point 124. The first ray 130 and the second ray 132 form different respective angles α1 and α2 with the respective surface normals 126 and 128. The angles α1 and α2 may be defined, for example, using spherical coordinates for each pixel and its surface normal relative to a datum of a coordinate system in which the first video camera 108 is located. That is, each pixel of the rendering panel 102 has an individually determinable viewing angle or "aspect" relative to the aperture of the first video camera 108, and the aspects are generally unique for each pixel in the FOV of the first video camera 108, although symmetries may exist between certain of these pixels. The location of the rendering panel 102 relative to each of the first video camera 108 and the orientation of the first video camera 108 relative to the rendering panel 102 may be sensed using inertial sensors, positioning system (e.g., GPS) receivers, with other camera tracking and pose methods, or measured directly using rotational encoders on a tripod or the crane camera mount M1. A processor in the camera controller 112 or in the panel controller 104 that receives the relative position and orientation data may compute the unique aspect for each pixel within the FOV of the first video camera 108. In accordance with an embodiment, the processing may be performed in the rendering engine 116 instead of the camera controller 112 or in the panel controller 104 since the rendering engine 116 will need the location and orientation information of the first video camera 108 to perform the correct rendering. The unique aspect between each pixel or cluster of pixels of the rendering panel 102 and the first video camera 108 may sometimes be referred to herein as an angular offset between the first video camera 108 and at least one pixel of an image displayed by the rendering panel 102, or as an angle of emission from the rendering panel 102.

It should be appreciated that what is true for individual pixels applies similarly to clusters of pixels around a common on-axis direction. Thus, the methods herein may be applied to control of individual pixels or pixel clusters, for example, clusters made up of 2, 3, 4, 9, 16 or 25 pixels clustered around a point without intervening pixels within outer boundaries of the cluster.

Figure 1C:
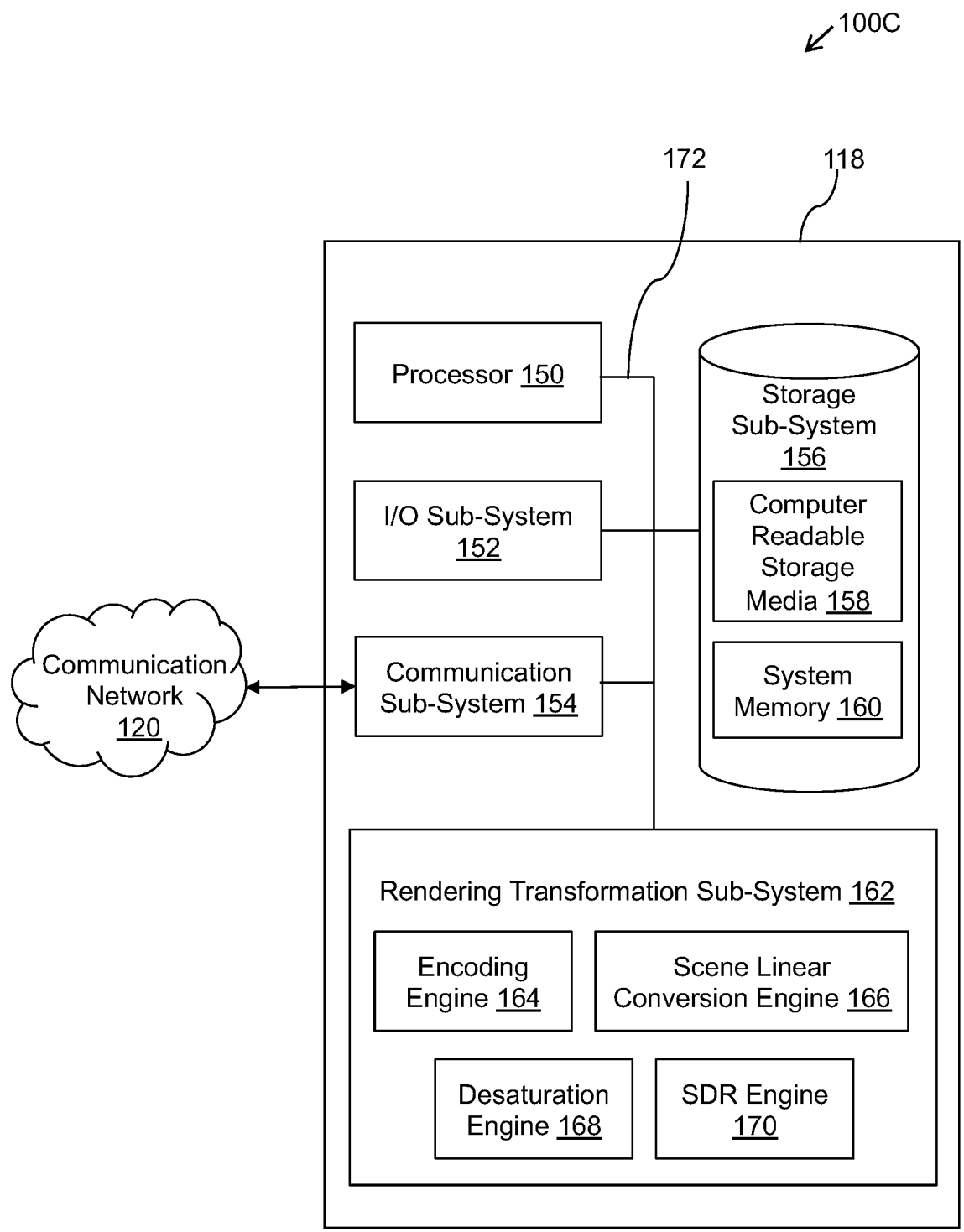
FIG. 1C is a block diagram that illustrates an exemplary production server for generating video content with hue-preservation in virtual production, in accordance with exemplary embodiments of the disclosure.

FIG. 1C is a block diagram that illustrates an exemplary production server for generating video content with hue-preservation in virtual production, in accordance with exemplary embodiments of the disclosure. FIG. 1C is described in conjunction with FIG. 1A. Referring to FIG. 1C, the block diagram 100C of the exemplary production server, such as the production server 118, comprises a processor 150 that communicates with several peripheral sub-systems, such as an input/output (I/O) sub-system 152, a communication sub-system 154, and a storage sub-system 156. The storage sub-system 156 may further include a computer readable storage media 158 and a system memory 160. The production server 118 may be further communicatively coupled to several additional processors integrated to form a rendering transformation sub-system 162. The additional processors in the rendering transformation sub-system 162 may include, for example, an encoding engine 164, a scene linear conversion engine 166, a desaturation engine 168, and an SDR engine 170. The number of peripheral sub-systems and the additional processors may communicate with each other via a bus 172.

In some embodiments of the disclosure, the additional processors may be to form an integrated system, such as the rendering transformation sub-system 162, as illustrated in block diagram 100C of FIG. 1C. In other embodiments of the disclosure, the one or more sub-systems and the additional processors may be distinct from each other. Other separation and/or combination of the various sub-systems may be integrated with the additional processors of the production server 118 illustrated in block diagram 100C of FIG. 1C may be done without departing from the spirit and scope of the various embodiments of the disclosure.

The processor 150 may comprise suitable logic, circuitry, interfaces, and/or code that may be operable to process and execute a set of instructions stored in the computer readable storage media 158 and/or the system memory 160. The processor 150, which may be implemented as one or more integrated circuits (for example, a conventional microprocessor or microcontroller), may be configured to control the operation of the production server 118. The one or more additional processors may be included in the processor 150. Such processors may include single core or multicore processors. In accordance with an embodiment, the processor 150 may be implemented as one or more independent processing units and/or a sub-processing unit with single or multicore processors. In accordance with another embodiment, the processor 150 may also be implemented as a quad-core processing unit formed by integrating two dual-core processors into a single chip.

In accordance with an embodiment, the processor 150 may execute various programs in response to program code and may maintain multiple concurrently executing programs or processes. At a specific timestamp, some or all of the program code to be executed may be resident in the processor 150 and/or in storage sub-system 156. The production server 118 may additionally include a digital signal processor (DSP), a special-purpose processor, and/or the like.

The I/O sub-system 152 may include input devices and output devices. The input devices may include a keyboard, a pointing device (such as a mouse or a trackball), a touchpad or a touch screen incorporated into a display, a scroll wheel, a click wheel, a dial, a hardware or software button, a switch, a keypad, audio input devices with voice command recognition systems, microphones, and other types of input devices. The input devices may further include motion sensing, voice recognition sensing devices, and/or gesture recognition devices that enables users to control and interact with an input device using gestures and spoken commands. The output devices may include a display sub-system, indicator lights, or non-visual displays, such as audio output devices, and the like. The display sub-system may be a cathode ray tube (CRT), a flat-panel device, such as that using a liquid crystal display (LCD) or plasma display, a projection device, a touch screen, and the like.

The communication sub-system 154 may provide an interface to other computer systems and networks. The communication sub-system 154 may serve as an interface for receiving data from and transmitting data to other systems and sub-systems from the production server 118. For example, communication sub-system 154 may enable the production server 118 to communicate with one or more devices via the Internet. In some embodiments, the communication sub-system 154 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, the communication sub-system 154 may provide wired network connectivity (e.g., Ethernet) in addition to or instead of a wireless interface.

The storage sub-system 156 may be capable of providing mass storage for the production server 118. Various software (such as programs, code modules, and instructions) that when executed by the processor 150 may provide the functionality described. The storage sub-system 156 may also provide a repository for storing data used in accordance with the present disclosure. In combination with the system memory 160, the computer readable storage media 158 may comprehensively represent remote, local, fixed, and/or removable storage devices and storage media for temporarily and/or more permanently containing, storing, transmitting, and retrieving computer readable information.

The computer readable storage media 158 may include code, or portions of code, may also include any appropriate media known or used in the art, including storage media and communication media, such as but not limited to, volatile and non-volatile, removable, and non-removable media implemented in any method or technology for storage and/or transmission of information. This may include tangible computer readable storage media, such as random access memory (RAM), read-only memory (ROM), electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer readable media, such as data signals, data transmissions, or any other medium which may be used to transmit the desired information, and which may be accessed by the production server 118.

The system memory 160 may store program instructions that are loadable and executable on the processor 150, as well as data generated during the execution of such programs. Based on the configuration and type of the production server 118, the system memory 160 may be volatile (such as RAM) and/or non-volatile (such as ROM and flash memory). The RAM typically contains data and/or program modules that are immediately accessible to and/or presently being operated and executed by processor 150. In some implementations, the system memory 160 may include multiple different types of memory, such as static random access memory (SRAM) or dynamic random access memory (DRAM). In some implementations, a basic input/output system (BIOS), containing the basic routines that help to transfer information between elements within the production server 118, such as during start-up, may typically be stored in the ROM. By way of example, and not limitation, the system memory 160 may also illustrate application programs, which may include client applications, web browsers, mid-tier applications, relational database management systems (RDBMS), program data, and an operating system. By way of example, the operating system may include various versions of Microsoft Windows™, Apple Macintosh™ and/or Linux operating systems, a variety of commercially available UNIX™ or UNIX-like operating systems (including without limitation the variety of GNU/Linux operating systems, the Google Chrome™ OS, and the like) and/or mobile operating systems, such as iOS™, Windows™ Phone, Android™OS, BlackBerry™ 10 OS, and Palm™ OS operating systems.

The rendering transformation sub-system 162 may comprise suitable logic, circuitry, interfaces, and/or code that may be operable to perform various rendering transformations for generating video content with hue-preservation in virtual production. The rendering transformation sub-system 162 may realize rendering color pipelines to perform such rendering transformations. In accordance with an embodiment, the rendering transformation sub-system 162 may be implemented as a combination of one or more independent processing units and/or sub-processing units with single or multicore processors, communicatively coupled to each other to form an integrated system. In accordance with another embodiment, such independent processing units and/or sub-processing units may be implemented as a quad-core processing unit formed by integrating two dual-core processors into a single chip. Examples of such one or more independent processing units and/or sub-processing units may include the encoding engine 164, the scene linear conversion engine 166, the desaturation engine 168, and the SDR engine 170.

The encoding engine 164 may comprise suitable logic, circuitry, interfaces, and/or code that may be operable to determine data in a scene-based encoding format based on raw data received in a pre-defined format. The scene-based encoding encodes the grayscale characteristic of the original scene. The scene-based encoding may correspond to logarithmic encoding because stops are a logarithmic measure of scene brightness. The pixel values may increase by a fixed amount with each increase of exposure measured in stops. For example, the scene-based encoding format may correspond to AWG Log C format in case the pre-defined format of the raw data is ARRIRAW™ format corresponding to an ARRI™ ALEXA LF camera. The data determined by the encoding engine 164 in the scene-based encoding format may indicate that a relation between exposure measured in stops and the signal is constant over a wide range. The encoding engine 164 may be configured to communicate the data in the scene-based encoding format to the scene linear conversion engine 166, via the bus 172.

The scene linear conversion engine 166 may comprise suitable logic, circuitry, interfaces, and/or code that may be operable to determine scene linear data based on the data in the scene-based encoding format. The scene linear conversion engine 166 may determine the scene linear data using linear encoding according to which digital values are radiometrically linear and are proportional to the relative brightness in the original scene. Scene linear data is mostly used in VFX processing as it is the natural encoding for computer generated elements. For example, the ALEXA™ camera has a dynamic range of 14 stops which is a linear range of more than 15,000:1.

In accordance with an embodiment, the scene linear conversion engine 166 may be configured to communicate the scene linear data to the desaturation engine 168, via the bus 172, when the desaturation engine 168 is configured to control the saturation before the tonemapping of the norm value of the three primary color values (performed by the SDR engine 170). In accordance with another embodiment, the scene linear conversion engine 166 may be configured to communicate the scene linear data to the SDR engine 170, via the bus 172, when the desaturation engine 168 is configured to control the saturation after the tonemapping of the norm value of the three primary color values.

The desaturation engine 168 may comprise suitable logic, circuitry, interfaces, and/or code that may be operable to control the saturation of the scene linear data. The desaturation engine 168 may control the saturation of the scene linear data when the first color gamut corresponding to the pre-defined format is mapped to the second color gamut corresponding to a display-based encoding color space.

In accordance with an embodiment, the desaturation engine 168 may be configured to control the saturation before the tonemapping of the norm value of the three primary color values. In accordance with another embodiment, the desaturation engine 168 may be configured to control the saturation after the tonemapping of the norm value of the three primary color values.

The SDR engine 170 may comprise suitable logic, circuitry, interfaces, and/or code that may be operable to determine SDR video content in the display-based encoding color space based on the scene linear data. The display-based encoding may encode the grayscale characteristic of the reproduced scene and is designed for a specific type of display that uses neither a linear nor a logarithmic encoding. For example, Rec 709 for television monitors or DCI P3 for digital cinema projectors.

The SDR engine 170 may perform associated transformations and conversions, such as determination of norm values, a display linear representation of the norm value for the first color gamut, determination of a scaling factor, determination of display linear representations, and the like. All such transformations and conversions are described in detail in flowcharts 200A and 200B illustrated in FIGS. 2A and 2B, respectively.

The bus 172 may provide a mechanism for enabling the various processors and sub-systems of the production server 118 communicate with each other as intended. Although the bus 172 is shown schematically as a single bus, alternative embodiments of the bus sub-system may utilize multiple buses. The bus 172 may be any of several types of bus structures, such as a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

In accordance with various implementations, the production server 118 may be a handheld portable device (for example, an iPhone™ cellular phone, an iPad™ computing tablet, a personal digital assistant, a wearable device (for example, a Google Glass™ head mounted display), a personal computer, a workstation, a mainframe, a kiosk, a server rack, or any other data processing system. Due to the ever-changing nature of computers and networks, the description of the production server 118 depicted in the block diagram 100C of FIG. 1C should not be construed to be limiting. Many other configurations having more or fewer components than the system depicted in the block diagram 100C of FIG. 1C may be possible. For example, customized hardware might also be used and/or elements might be implemented in hardware, firmware, software (including applets), or a combination. Further, connection to other computing devices, such as network input/output devices, may be employed. Based on the disclosure and teachings provided herein, other ways and/or methods may be used to implement the various embodiments, without deviation from the scope of the disclosure.

In operation, the communication sub-system 154 may receive raw data in a pre-defined format from the graphic processing engine 114, via the communication network 120. The encoding engine 164 may be configured to determine data in a scene-based encoding format based on the raw data received in the pre-defined format. The scene linear conversion engine 166 may determine scene linear data based on the data in the scene-based encoding format. The desaturation engine 168 may control the saturation of the scene linear data when the first color gamut corresponding to the pre-defined format is mapped to the second color gamut corresponding to a display-based encoding color space. In such embodiment, the first color gamut is wider than the second color gamut. The SDR engine 170 may determine SDR video content in the display-based encoding color space based on the scene linear data. In such embodiment, hue of the SDR video content is preserved, when the rendering panel 102 is in-focus or out-of-focus, based on a scaling factor that is applied to three primary color values that describe the first color gamut.

The SDR engine 170 may determine a norm value of the three primary color values based on a mathematical function applied on the three primary color values in the scene linear data. Based on the tonemap of the determined norm value of the three primary color values, the SDR engine 170 may determine a display linear representation of the norm value for the first color gamut. The SDR engine 170 may further determine a scaling factor based on a ratio of the display linear representation of the norm value for the first color gamut and the norm value of the three primary color values. Based on the scaling factor and corresponding primary color value in the scene linear data, the SDR engine 170 may determine a first display linear representation of each of the three primary color values that describes the first color gamut. The SDR engine 170 may further determine a second display linear representation of each of the three primary color values in the display-based encoding color space based on the first display linear representation of the three primary color values that describes the first color gamut. In accordance with an embodiment, based on gamma correction on the second display linear representation of each of the three primary color values in the display-based encoding color space, the SDR engine 170 may generate a video signal and communicate the generated video signal, as the SDR video content, to the SDR video display or stored in the storage sub-system 156. In accordance with another embodiment, an HDR display system may be targeted instead of an SDR display system that includes the SDR video display. In such embodiment, a modification of the tone curve may be applied to the norm value of the scene linear data. Further, the gamma correction for the SDR may be replaced with an appropriate inverse-EOTF suitable for the HDR display (e.g. Inverse-PQ-EOTF (defined in SMPTE ST2084 and ITU-R BT.2100), or the Inverse-HLG-EOTF (defined in ITU-R BT.2100)).

Figure 2A:
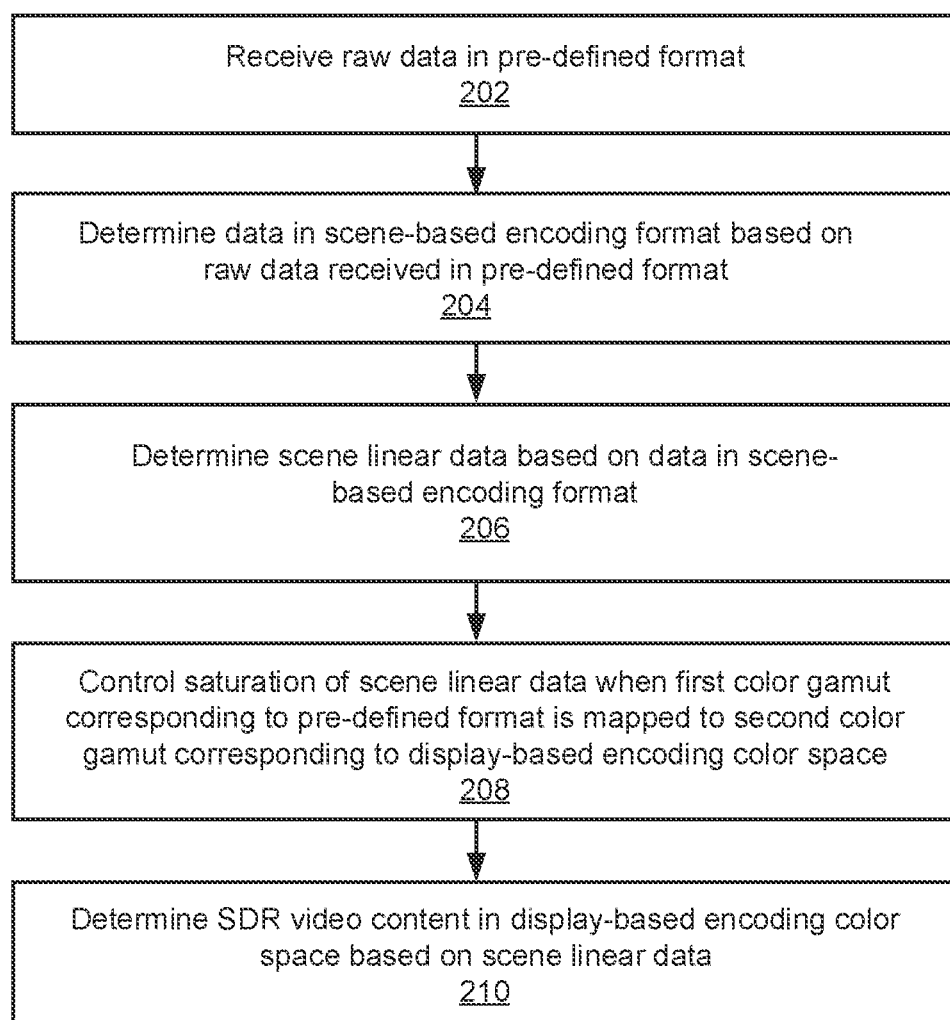
FIGS. 2A and 2B collectively depict a flowchart illustrating exemplary operations for generating video content with hue-preservation in virtual production by the production server of FIG. 1C, in accordance with an exemplary embodiment of the disclosure.
Figure 2B:
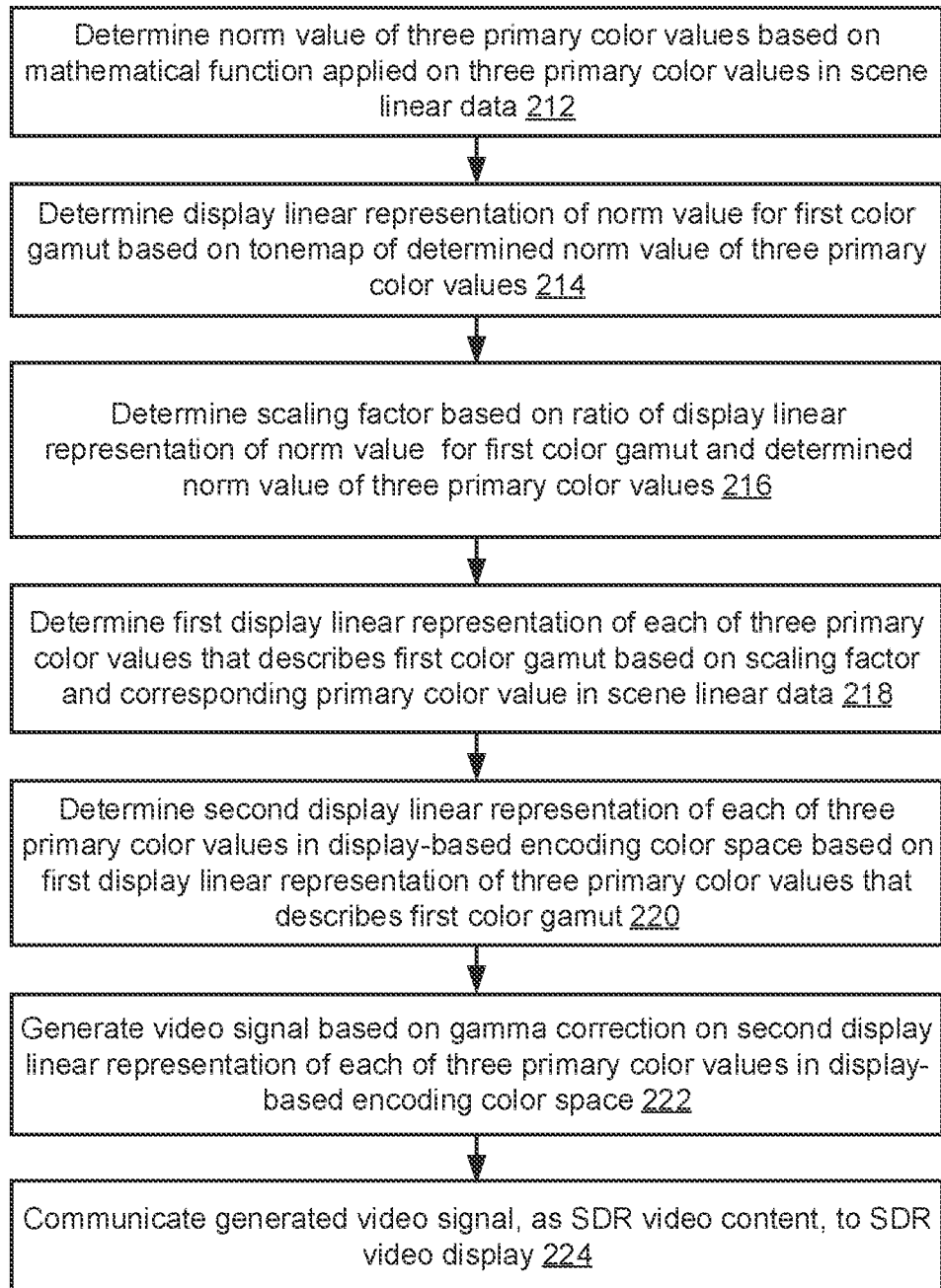

FIGS. 2A and 2B depict flowcharts illustrating exemplary operations for generating video content with hue-preservation in virtual production by the production server 118 of FIG. 1C, in accordance with an exemplary embodiment of the disclosure. Respective flowcharts 200A and 200B in FIGS. 2A and 2B collectively depict a method for generating video content with hue-preservation in virtual production by the production server 118 of FIG. 1C, are described in conjunction with FIGS. 1A, 1B, 1C, 3A, 3B, 4A, and 4B.

Referring to the flowchart 200A of FIG. 2A, at 202, raw data may be received in a pre-defined format. In accordance with an embodiment, the communication sub-system 154 in the rendering transformation sub-system 162 of the production server 118, may be configured to receive the raw data in the pre-defined format from the graphic processing engine 114, via the communication network 120. In accordance with an embodiment, the raw data may include a computer-generated background rendered on the rendering panel 102 and an image or video of the foreground object 106, such as an actor.

In an exemplary embodiment, the pre-defined format of the raw data may correspond to ARRIRAW™ format in case the first video camera 108 is an ARRI™ ALEXA LF camera, as the ARRI™ ALEXA LF camera captures data in ARRIRAW™ format on the set where the scene 110 is shot. The ARRIRAW™ is the format of ARRI™ for uncompressed, unencrypted, and uncompromised sensor data, which may be considered as a digital version of the camera negative. The ARRIRAW™ retains the natural color response and great exposure latitude of the ARRI™ ALEXA LF camera as uncompressed and unprocessed sensor data. The ARRIRAW™ data may be processed to convert a single channel image, which represents the raw Bayer pattern sensor readout, into a color image suitable for normal viewing. In accordance with the exemplary embodiment, the first video camera 108 may support in-camera recording of ARRIRAW™ data.

It may be noted that the formats, encoding techniques and rendering transformations associated with a specific camera described above and hereinafter in accordance with the exemplary embodiment is merely for illustration purposes and should not be construed to limit the scope of the disclosure. Other formats, encoding and transformations associated with corresponding cameras may also be implemented without deviating from the scope of the disclosure.

At 204, data may be determined in a scene-based encoding format based on the raw data received in the pre-defined format. In accordance with an embodiment, the encoding engine 164 in the rendering transformation sub-system 162 of the production server 118, may be configured to determine the data in the scene-based encoding format based on the raw data received in the pre-defined format. In other words, the raw data may be transformed to the scene-based encoding format for post-production by the encoding engine 164.

In accordance with the exemplary embodiment, the scene-based encoding format may correspond to AWG Log C format for post-production. The logarithmic encoding of the scene 110 may indicate that the relation between exposure measured in stops and the signal is constant over a wide range, wherein each stop of exposure increases the sensor signal by the same amount. Such stops are a logarithmic measure of scene brightness. Thus, the logarithmic encoding encodes the grayscale characteristics of the original scene 110.

At 206, scene linear data may be determined based on the data in the scene-based encoding format. In accordance with an embodiment, the scene linear conversion engine 166 in the rendering transformation sub-system 162 of the production server 118, may be configured to determine scene linear data based on the data in the scene-based encoding format. In other words, data in the scene-based encoding format may be converted to scene linear data by the scene linear conversion engine 166.

In accordance with the exemplary embodiment, the scene linear conversion engine 166 may be configured to convert the scene-based encoding format to the scene linear data, based on the equations (1) or (2), mathematically expressed as:

$$y=(\text{pow}(10.0,(x-d)/c)-b)/a \text{ when } x>(e*\text{cut}+f) \quad \text{Equation (1)}$$

$$y=(x-f)/e \text{ when } x<(e*\text{cut}+f) \quad \text{Equation (2)}$$

were
x is the Log C value in range [0.0-1.0],
y denotes the scene linear data, and
cut and a through f denote parameters.

For a particular image being encoded, the values of cut and a through f may depend on version of the scene-based encoding (i.e. Log C encoding), type of scene linear data (i.e. normalized sensor value or relative scene exposure factor), and exposure index.

At 208, a saturation of the scene linear data may be controlled when a first color gamut corresponding to the pre-defined format is mapped to a second color gamut corresponding to a display-based encoding color space. In accordance with an embodiment, the desaturation engine 168 in the rendering transformation sub-system 162 of the production server 118, may be configured to control the saturation of the scene linear data when the first color gamut corresponding to the pre-defined format is mapped to the second color gamut corresponding to a display-based encoding color space. In such embodiment, the first color gamut is wider than the second color gamut.

In accordance with the exemplary embodiment, the AWG color space is a wider color gamut as compared to Rec 709 target color gamut that corresponds to the color space of the display, such as a high-definition television (HDTV) screen. Clearly, the AWG may represent colors that are more saturated than the Rec 709 color gamut. Thus, the process of converting the AWG to Rec 709 color gamut may include a gamut-mapping process that remaps the wide gamut colors in the AWG to the narrow gamut colors. An exemplary gamut-mapping process may include a desaturation operation, based on the equations (3), (4), (5), and (6), mathematically expressed as:

$$\text{gray}_{awg}=0.29195377899972*R\_\text{in}+\\0.82384104151070*G\_\text{in}+(-0.11579482051041)\\*B\_\text{in} \quad \text{Equation (3)}$$

$$R\_\text{out}=\text{gray\_awg}+\text{saturation\_value}*(R\_\text{in}-\text{gray\_awg}) \quad \text{Equation (4)}$$

$$G\_\text{out}=\text{gray\_awg}+\text{saturation\_value}*(G\_\text{in}-\text{gray\_awg}) \quad \text{Equation (5)}$$

$$B\_\text{out}=\text{gray\_awg}+\text{saturation\_value}*(B\_\text{in}-\text{gray\_awg}) \quad \text{Equation (6)}$$

where
saturation_value, for example "0.5", is a desaturation factor between 0-1, R_in, G_in, and B_in are input values of the red, green, and blue components of the AWG, R_out, G_out, and B_out are output values of the red, green, and blue components of the AWG, gray_awg is a weighted average of the red, green, and blue components of the AWG, with weighted coefficients corresponding to a luminance weighting, for example, approximately [0.3, 0.8, −0.1].

Based on the equations (3), (4), (5), and (6), the gamut-mapping of all the color values is performed. In another embodiment, a more complex process may be used in which only highly saturated values outside the Rec 709 target color gamut are reduced and values that are not very saturated are not modified, referred to as "protecting" core colors that are not out of the color gamut.

In accordance with various embodiments, besides RGB, alternate color spaces that are more hue-linear and thus better hue-uniformity, may be used to perform the desaturation operation. Examples of such alternate color spaces may be CIELAB color space, CIELUV color space, ITP, ICtCp, Jazbz, and the like. In such embodiments, the AWG data may be converted to an alternate color space, then the saturation is reduced in the alternate color space, followed by conversion of the data back to the AWG data.

At 210, an SDR video content may be determined in the display-based encoding color space based on the scene linear data. In accordance with an embodiment, the SDR engine 170 in the rendering transformation sub-system 162 of the production server 118, may be configured to determine the SDR video content in the display-based encoding color space based on the scene linear data. In such embodiment, hue of the SDR video content is preserved, when the rendering panel 102 is in-focus or out-of-focus, based on a scaling factor that is applied to three primary color values that describe the first color gamut, described in detail in flowchart 200B of FIG. 2B.

Referring to FIG. 2B, the flowchart 200B is depicted for illustrating exemplary operations for determining the SDR video content in the display-based encoding color space based on the scene linear data, as introduced at step 210 in the flowchart 200A of FIG. 2A, in accordance with an exemplary embodiment of the disclosure. Further, FIGS. 3A and 3B that illustrate two graphical representations 300A and 300B respectively, associated with generation of video content with hue-preservation in virtual production by the production server 118 of FIG. 1C, are described in conjunction with the flowchart 200B of FIG. 2B, in accordance with an exemplary embodiment of the disclosure. Furthermore, FIGS. 4A and 4B that illustrate two exemplary scenarios 400A and 400B respectively, associated with generation of video content with hue-preservation in virtual production by the production server 118 of FIG. 1C, are described in conjunction with the flowchart 200B of FIG. 2B, in accordance with an exemplary embodiment of the disclosure.

At 212, a norm value of the three primary color values may be determined based on a mathematical function applied on the three primary color values in the scene linear data. In accordance with an embodiment, the SDR engine 170 in the rendering transformation sub-system 162 of the production server 118, may be configured to determine the norm value of the three primary color values based on a mathematical function applied on the three primary color values in the scene linear data. In accordance with various embodiments, the mathematical function may correspond to one of a maximum of the three primary color values, a linear average value of the three primary color values, a weighted average value of the three primary color values with approximate luminance weights for the first color gamut, or power cube over square of the three primary color values.

In accordance with the exemplary embodiment, the norm value of the three primary color values may be determined based on maximum of the three primary color values in the scene linear data, based on the equation (7), mathematically expressed as:

$$\text{norm max}RGB\_\text{awg} = \max(R\_\text{awg}, G\_\text{awg}, B\_\text{awg}) \quad \text{Equation (7)}$$

where

R_awg, G_awg, B_awg are the red, green, and blue components of the AWG, respectively.

In an example, the R_awg, G_awg, B_awg may correspond to R_in, G_in, and B_in that are input values of the Red, Green, and Blue components of the AWG, when desaturation is not performed or in other words, the saturation of the scene linear data is not controlled.

In another example, the R_awg, G_awg, B_awg may correspond to R_out, G_out, and B_out (with reference to Equations (4), (5), and (6)) that are output values of the Red, Green, and Blue components of the AWG, when desaturation is performed or in other words, the saturation of the scene linear data is controlled. In such example, the AWG color gamut is mapped to a target color gamut, i.e. Rec 709.

It may be noted that the above norm value determined based on the equation (7) is merely for exemplary purposes and should not be construed to limit the scope of the disclosure. Notwithstanding, without deviating from the scope of the disclosure, other norm values may be determined based on one of the equations (8), (9), and (10), mathematically expressed as:

$$\text{norm avg}RGB = (R\_\text{awg} + G\_\text{awg} + B\_\text{awg})/3 \quad \text{Equation (8)}$$

$$\text{norm } w\_\text{avg}RGB = (0.3 * R\_\text{awg} + 0.8 * G\_\text{awg} + (-0.1) * B\_\text{awg}) \quad \text{Equation (9)}$$

$$\text{norm power\_cube\_over\_squares}RGB = \\ (R\_\text{awg} * R\_\text{awg} * R\_\text{awg} + \\ G\_\text{awg} * G\_\text{awg} * G\_\text{awg} + \\ B\_\text{awg} * B\_\text{awg} * B\_\text{awg})/(R\_\text{awg} * R\_\text{awg} + \\ G\_\text{awg} * G\_\text{awg} + B\_\text{awg} * B\_\text{awg}) \quad \text{Equation (10)}$$

At 214, a display linear representation of the norm value for the first color gamut may be determined based on a tonemap of the determined norm value of the three primary color values. In accordance with an embodiment, the SDR engine 170 in the rendering transformation sub-system 162 of the production server 118, may be configured to determine the display linear representation of the norm value for the first color gamut based on the tonemap of the determined norm value of the three primary color values. The tonemap may be a function or a curve that renders the scene linear data into an SDR display linear representation of the video content.

In accordance with the exemplary embodiment, the tonemap may be described, for example by a 41-point rendering lookup table (LUT) of input/output points that is based on the scene linear data as the input points, based on the rendering LUT, as provided below:

| Input Points (Scene Linear Data) | Output Points (SDR Display Linear Representation) |
| --- | --- |
| −0.017290418 | 0 |
| −0.012632891 | 0.000787 |
| −0.007975364 | 0.0016395 |
| −0.003317836 | 0.0025806 |

| Input Points (Scene Linear Data) | Output Points (SDR Display Linear Representation) |
| --- | --- |
| 0.001339691 | 0.0036333 |
| 0.005997219 | 0.004822 |
| 0.010654894 | 0.0063188 |
| 0.015916138 | 0.0083387 |
| 0.022557012 | 0.011074 |
| 0.030939288 | 0.0147836 |
| 0.041519608 | 0.0198137 |
| 0.054874351 | 0.0269311 |
| 0.071731042 | 0.0375213 |
| 0.093007979 | 0.0523762 |
| 0.11986426 | 0.0721173 |
| 0.15376293 | 0.0970327 |
| 0.196550678 | 0.1269397 |
| 0.250558444 | 0.1619765 |
| 0.318728396 | 0.2024278 |
| 0.404774214 | 0.2484255 |
| 0.513383396 | 0.3000142 |
| 0.650472621 | 0.3571444 |
| 0.823510068 | 0.4196671 |
| 1.041922259 | 0.4873303 |
| 1.317607586 | 0.5597759 |
| 1.665584499 | 0.6337109 |
| 2.104809657 | 0.7014676 |
| 2.659210632 | 0.761687 |
| 3.358989402 | 0.8137679 |
| 4.242267659 | 0.8575427 |
| 5.357163556 | 0.8932168 |
| 6.764413029 | 0.9213046 |
| 8.540678494 | 0.9425666 |
| 10.78272517 | 0.9579509 |
| 13.61269253 | 0.9685406 |
| 17.18474808 | 0.9755101 |
| 21.6934859 | 0.9800903 |
| 27.38452748 | 0.9835433 |
| 34.56790244 | 0.9871482 |
| 43.63493789 | 0.9921967 |
| 55.0795767 | 1 |

In accordance with the exemplary embodiment, the above rendering LUT may be derived based on a transformation of a legacy LUT in which the input points correspond to Log C values and the output points correspond to SDR Display Linear Representation. In an embodiment, the transformation may be based on a first approach, according to which a polynomial is fitted to the set of points and then use the fitted polynomial to determine new input/output points. By way of an example, the polynomial may be an 8-degree polynomial that may be fit to the rendering LUT for Log C to SDR display linear representation based on the equation (11), mathematically expressed as:

$$y = p1*x^8 + p2*x^7 + p3*x^6 + p4*x^5 + p5*x^4 + p6*x^3 + p7*x^2 + p8*x + p9 \quad \text{Equation (11)}$$

where
p1 to p9 are pre-specified parameters, and
x is the Log C value in range [0.0-1.0], and
y is the corresponding scene linear value.
In an embodiment, the transformation may be based on a first approach, according to the Log C may be applied to scene linear conversion by inverting the inverse-Opto-Electrical Transfer Function (OETF), as described in equations (1) and (2).

Figure 3B:
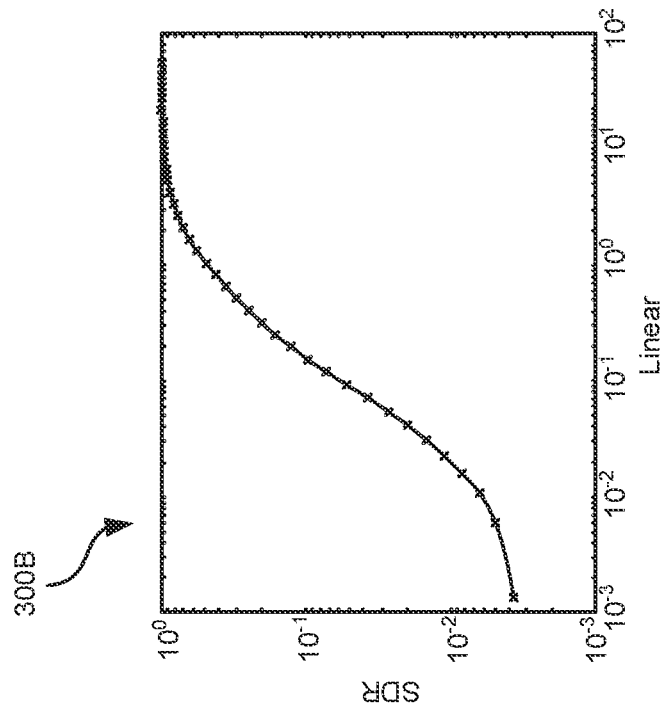
FIGS. 3A and 3B illustrate two graphical representations associated with generation of video content with hue-preservation in virtual production by the production server of FIG. 1C, in accordance with an exemplary embodiment of the disclosure.
Figure 3A:
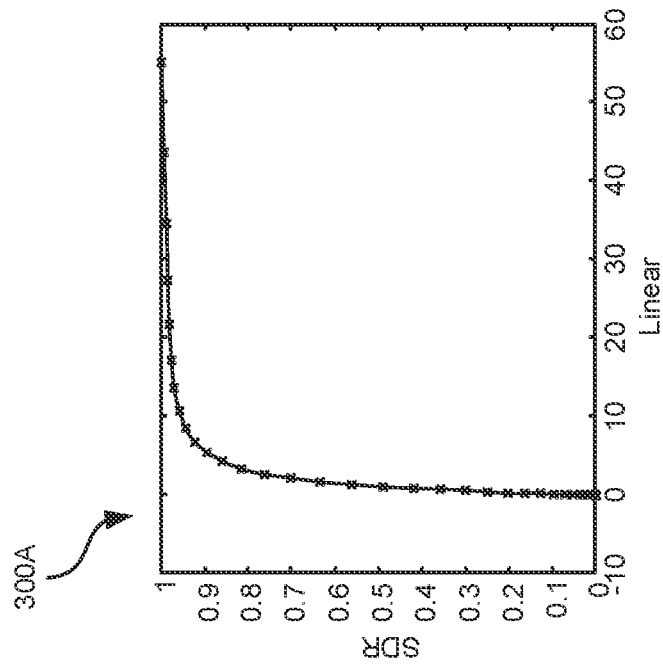

The tonemap may be further described by the two graphical representations 300A and 300B in FIGS. 3A and 3B, respectively. The graphical representation 300A in FIG. 3A illustrates a first rendering curve corresponding to the 41-point rendering LUT of input/output points plotted with linear plot axes. The graphical representation 300B in FIG. 3B illustrates a second rendering curve corresponding to the 41-point rendering LUT of input/output points plotted with logarithmic plot axes. The rendering curves, such as the first rendering curve in the graphical representation 300A and the second rendering curve in the graphical representation 300B, that accepts scene linear data as input points may be applied in different methods to preserve the hue of the resulting output. An exemplary method "MaxRGB" processing may be implemented in accordance with the equation (7) where norm maxRGB_awg is computed and then transformed using the rendering curves.

In accordance with the exemplary embodiment, the SDR engine 170 may be configured to apply the tonemap to the norm value determined based on the equation (7), i.e. norm maxRGB_awg, in accordance with the equation (12), mathematically expressed as:

$$\text{max}RGB\_display\_linear\_awg = \text{tonemap}(\text{norm} \text{ max}RGB\_awg) \quad \text{Equation (12)}$$

where
maxRGB_display_linear_awg is display linear representation of the norm value for the first color gamut, i.e. the AWG.

At 216, the scaling factor may be determined based on a ratio of the display linear representation of the norm value for the first color gamut and the norm value of the three primary color values. In accordance with an embodiment, the SDR engine 170 in the rendering transformation sub-system 162 of the production server 118, may be configured to determine the scaling factor based on the ratio of the display linear representation of the norm value for the first color gamut and the norm value of the three primary color values.

In accordance with the exemplary embodiment, the SDR engine 170 may be configured to compute the scaling factor based on the equation (13), mathematically expressed as:

$$\text{scaling\_factor} = \text{max}RGB\_display\_linear\_awg / \text{norm} \text{ max}RGB\_awg \quad \text{Equation (13)}$$

At 218, a first display linear representation of each of the three primary color values that describes the first color gamut may be determined based on the scaling factor and corresponding primary color value in the scene linear data. In accordance with an embodiment, the SDR engine 170 in the rendering transformation sub-system 162 of the production server 118, may be configured to determine the first display linear representation of each of the three primary color values that describes the first color gamut based on the scaling factor and corresponding primary color value in the scene linear data.

In accordance with the exemplary embodiment, each of the primary color value in the scene linear data may be multiplied with the scaling factor to compute corresponding first display linear representation of the corresponding primary color value that describes the first color gamut, based on the equations (14), (15), and (16), mathematically expressed as:

$$R\_display\_linear\_awg = \text{scaling\_factor} * R\_awg \quad \text{Equation (14)}$$

$$G\_display\_linear\_awg = \text{scaling\_factor} * G\_awg \quad \text{Equation (15)}$$

$$B\_display\_linear\_awg = \text{scaling\_factor} * B\_awg \quad \text{Equation (16)}$$

In accordance with the equations (14), (15), and (16), the scaling factor may be applied to all R, G, and B channels, i.e. R_awg, G_awg and B_awg, that describe the first color gamut. Accordingly, R_display_linear_awg, G_display_linear_awg, and B_display_linear_awg may be computed having the same ratio of R/G, R/B and G/B color values that existed in the input signal. As the ratio of R/G, R/B and G/B color values represents that the hue of the color remains same, therefore the hue is preserved (or the color is balanced) in the SDR display linear representation of each of the three primary color values in the display-based encoding color space, determined in the next step 220.

At 220, a second display linear representation of each of the three primary color values in the display-based encoding color space may be determined based on the first display linear representation of the three primary color values that describes the first color gamut. In accordance with an embodiment, the SDR engine 170 in the rendering transformation sub-system 162 of the production server 118, may be configured to determine the second display linear representation of each of the three primary color values in the display-based encoding color space based on the first display linear representation of the three primary color values that describes the first color gamut.

In accordance with the exemplary embodiment, the R_display_linear_awg, G_display_linear_awg, and B_display_linear_awg, that describe the first color gamut (i.e. the AWG), may be converted to the second display linear representation of each of the three primary color values in the display-based encoding color space, i.e. the Rec 709 color space, based on the equations (17), (18), and (19), mathematically expressed as:

$$R\_display\_linear\_709 = 1.61752343630680 * R\_display\_linear\_awg - 0.53728662218834 * G\_display\_linear\_awg - 0.08023681411847 * B\_display\_linear\_awg \quad \text{Equation (17)}$$

$$G\_display\_linear\_709 = -0.07057274089781 * R\_display\_linear_{awg} + 1.33461306233036 * G\_display\_linear\_awg - 0.26404032143252 * B\_display\_linear\_awg \quad \text{Equation (18)}$$

$$B\_display\_linear\_709 = -0.02110172804278 * R\_display\_linear\_awg - 0.22695387521828 * G\_display\_linear\_awg + 1.24805560326107 * B\_display\_linear\_awg \quad \text{Equation (19)}$$

where

R_display_linear_709, G_display_linear_709, and B_display_linear_709 indicate the second display linear representation of each of the three primary color values in the display-based encoding color space, i.e. the Rec 709 color space.

At 222, a video signal may be generated based on gamma correction on the second display linear representation of each of the three primary color values in the display-based encoding color space. In accordance with an embodiment, the SDR engine 170 in the rendering transformation sub-system 162 of the production server 118, may be configured to generate the video signal based on the gamma correction on the second display linear representation of each of the three primary color values in the display-based encoding color space. The gamma correction on the second display linear representation of each of the three primary color values in the display-based encoding color space may result in display non-linear representation of each of the three primary color values in the display-based encoding color space.

In accordance with the exemplary embodiment, Rec 709 Inverse-Electro-Optical Transfer Function (EOTF), i.e. the gamma correction, may be applied to create the video signal, based on the equations (20), (21), and (22), mathematically expressed as:

$$R\_display\_nonlinear\_709 = R\_display\_linear\_709^{\wedge}(1.0/2.4) \quad \text{Equation (20)}$$

$$G\_display\_nonlinear\_709 = G\_display\_linear\_709^{\wedge}(1.0/2.4) \quad \text{Equation (21)}$$

$$B\_display\_nonlinear\_709 = B\_display\_linear\_709^{\wedge}(1.0/2.4) \quad \text{Equation (22)}$$

At 224, the generated video signal may be communicated to an SDR video display as SDR video content. In accordance with an embodiment, the SDR engine 170 in the rendering transformation sub-system 162 of the production server 118, may be configured to communicate the generated video signal, as the SDR video content, to the SDR video display.

In accordance with another embodiment, an HDR display system may be targeted instead of an SDR display system that includes the SDR video display. In such embodiment, a modification of the tone curve may be applied to the norm value of the scene linear data. Further, the gamma correction for the SDR may be replaced with an appropriate inverse-EOTF suitable for the HDR display (e.g. Inverse-PQ-EOTF (defined in SMPTE ST2084 and ITU-R BT.2100), or the Inverse-HLG-EOTF (defined in ITU-R BT.2100)).

In accordance with the exemplary embodiment, the generated video signal may be communicated to the SDR Rec 709 video display for rendering. Hue is preserved, for example the hue remains blue, in such generated video signals when the rendering panel 102 is in-focus or out-of-focus. The result of a MaxRGB hue-preserving rendering is illustrated in FIGS. 4A and 4B when the rendering panel 102 is out-of-focus and in-focus respectively. FIG. 4A illustrates an exemplary scenario 400A, according to which a first captured content 110A is shown that includes image of the computer-generated background rendered on an out-of-focus rendering panel 102A and an in-focus image 106A of the foreground object 106, such as an actor. For the first captured content 110A, the hue of the out-of-focus rendering panel 102A appears to be blue.

FIG. 4B illustrates another exemplary scenario 400B, according to which a subsequent captured content 110B is shown that includes image of the computer-generated background rendered on an in-focus rendering panel 102B and an out-of-focus image 106B of the foreground object 106. For the subsequent captured content 110B, the hue of the in-focus rendering panel 102B still appears to be blue only. In FIG. 4B, the in-focus rendering panel 102B appears to be patterned due to moiré effect. As the hue remains blue in both the exemplary scenarios 400A and 400B, the hue is said to be preserved.

Figure 5:
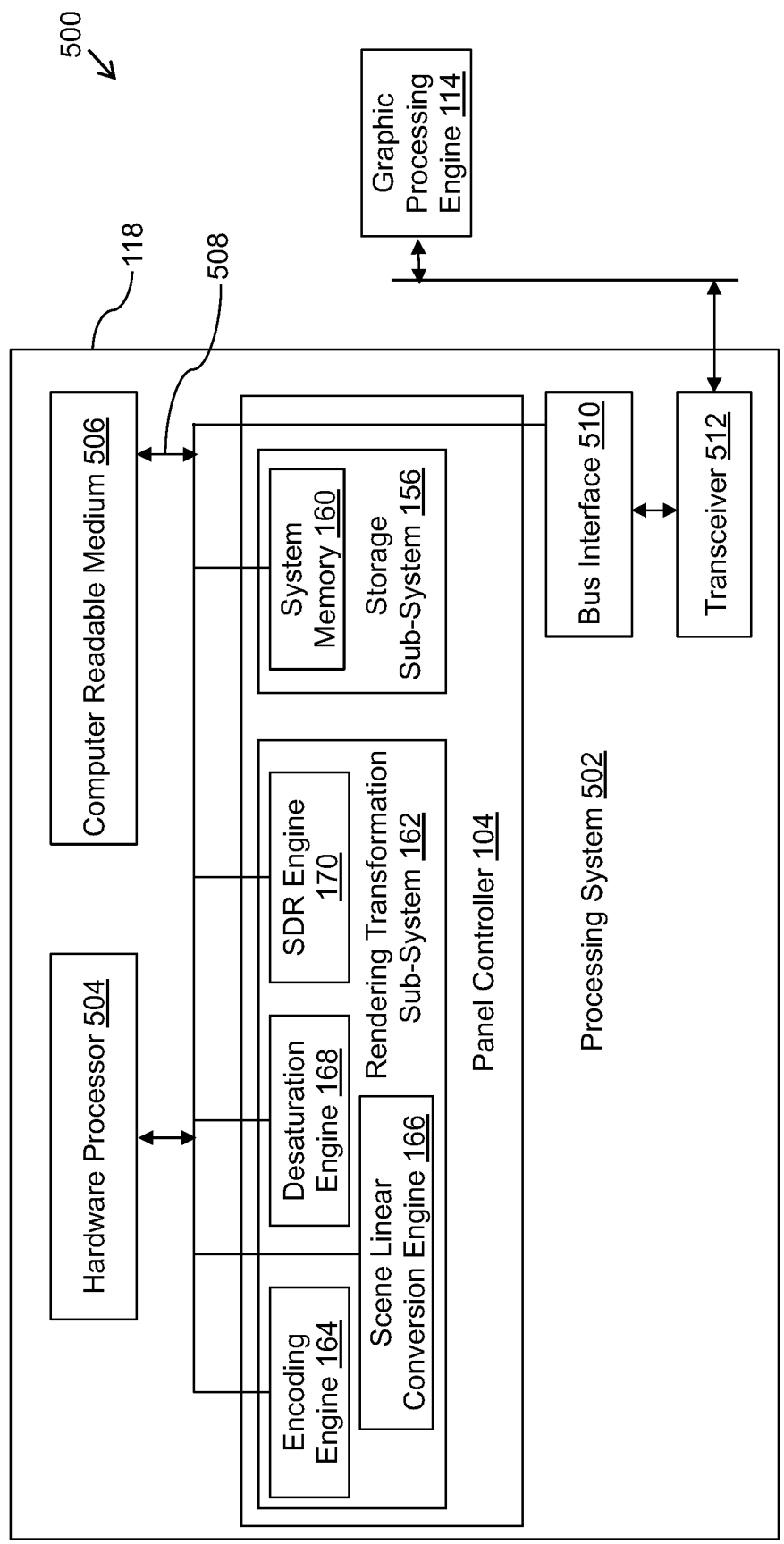
FIG. 5 is a conceptual diagram illustrating an example of a hardware implementation for the production server employing a processing system for generating video content with hue-preservation in virtual production, in accordance with exemplary embodiments of the disclosure.

FIG. 5 is a conceptual diagram illustrating an example of a hardware implementation for the production server 118 employing a processing system for generating video content with hue-preservation in virtual production, in accordance with exemplary embodiments of the disclosure. Referring to FIG. 5, the hardware implementation shown by a representation 500 for the production server 118 employs a processing system 502 for generating video content with hue-preservation in virtual production, in accordance with an exemplary embodiment of the disclosure, as described herein.

In some examples, the processing system 502 may comprise one or more hardware processors 504 (such as the processor 150), a non-transitory computer readable medium 506 (such as the computer readable storage media 158), a bus 508 (such as the bus 172), a bus interface 510, and a transceiver 512 (such as the communication sub-system 154). FIG. 5 further illustrates the rendering transformation sub-system 162 (that includes the encoding engine 164, the scene linear conversion engine 166, the desaturation engine 168, and the SDR engine 170) and the storage sub-system 156, as described in detail in the block diagram 100C of FIG. 1C.

The one or more hardware processors 504 may be configured to manage the bus 508 and general processing, including the execution of a set of instructions stored on the non-transitory computer readable medium 506. The set of instructions, when executed by the one or more hardware processors 504, causes the production server 118 to execute the various functions described herein for any particular apparatus. The one or more hardware processors 504 may be implemented, based on several processor technologies known in the art. Examples of the one or more hardware processors 504 may be a RISC processor, an ASIC processor, a CISC processor, and/or other processors or control circuits.

The non-transitory computer readable medium 506 may be used for storing data that is manipulated by the one or more hardware processors 504 when executing the set of instructions. The data is stored for short periods or in the presence of power. The non-transitory computer readable medium 506 may also be configured to store data for one or more of: the encoding engine 164, the scene linear conversion engine 166, the desaturation engine 168, and the SDR engine 170 in the rendering transformation sub-system 162.

The bus 508 is configured to link together various circuits. In this example, the production server 118 employing the one or more hardware processors 504 and the non-transitory computer readable medium 506 may be implemented with bus architecture, represented generally by the bus 508. The bus 508 may include any number of interconnecting buses and bridges depending on the specific implementation of the production server 118 and the overall design constraints. The bus interface 510 may be configured to provide an interface between the bus 508 and other circuits, such as the transceiver 512, and external devices, such as the graphic processing engine 114.

The transceiver 512 may be configured to provide a communication of the production server 118 with various other apparatus, such as the graphic processing engine 114, via the communication network 120. The transceiver 512 may communicate via wireless communication with networks, such as the Internet, the Intranet and/or a wireless network, such as a cellular telephone network, a WLAN and/or a MAN. The wireless communication may use any of a plurality of communication standards, protocols, and technologies, such as GSM, EDGE, LTE, W-CDMA, CDMA, TDMA, Bluetooth, Wi-Fi (such as IEEE 802.11a, IEEE 802.11b, IEEE 802.11g and/or IEEE 802.11n), VoIP, and/or Wi-MAX.

It should be recognized that, in some embodiments of the disclosure, one or more components of FIG. 5 may include software whose corresponding code may be executed by at least one processor, for multiple processing environments. For example, the encoding engine 164, the scene linear conversion engine 166, the desaturation engine 168, and the SDR engine 170 in the rendering transformation sub-system 162 may include software that may be executed across a single or multiple processing environments.

In an aspect of the disclosure, the one or more hardware processors 504, the non-transitory computer readable medium 506, or a combination of both may be configured or otherwise specially programmed to execute the operations or functionality of the encoding engine 164, the scene linear conversion engine 166, the desaturation engine 168, and the SDR engine 170 in the rendering transformation sub-system 162, or various other components described herein, as described with respect to the block diagram 100C of FIG. 1C.

Various embodiments of the disclosure comprise the production server 118 that may be configured to generate video content with hue-preservation in virtual production. The production server 118 may comprise, for example, the processor 150, the I/O sub-system 152, the communication sub-system 154, the storage sub-system 156 comprising the computer readable storage media 158 and the system memory 160, and the rendering transformation sub-system 162. The rendering transformation sub-system 162 may include the encoding engine 164, the scene linear conversion engine 166, the desaturation engine 168, and the SDR engine 170. In accordance with an embodiment, the system may comprise a memory, such as the storage sub-system 156, for storing instructions. The system may further comprise a processor, such as the encoding engine 164, the scene linear conversion engine 166, the desaturation engine 168, and the SDR engine 170, for executing the instructions to perform a method. The method may comprise determining data in a scene-based encoding format based on raw data received in a pre-defined format. The raw data may include a computer-generated background rendered on the rendering panel 102 and the foreground object 106. The method may further comprise determining scene linear data based on the data in the scene-based encoding format. The method may further comprise controlling a saturation of the scene linear data when a first color gamut corresponding to the pre-defined format is mapped to a second color gamut corresponding to a display-based encoding color space. The first color gamut may be wider than the second color gamut. The method may further comprise determining an SDR video content in the display-based encoding color space based on the scene linear data. The hue of the SDR video content is preserved, when the rendering panel 102 is in-focus or out-of-focus, based on a scaling factor that is applied to three primary color values that describe the first color gamut.

In accordance with an embodiment, the method may further comprise determining a first norm value of the three primary color values based on a mathematical function applied on the three primary color values in the scene linear data. The mathematical function may correspond to one of a maximum of the three primary color values, a linear average value of the three primary color values, a weighted average value of the three primary color values with approximate luminance weights for the first color gamut, or power cube over square of the three primary color values.

In accordance with an embodiment, the method may further comprise determining a display linear representation of the norm value for the first color gamut based on a tonemap of the determined norm value of the three primary color values. The tonemap may be a function that renders the scene linear data into an SDR display linear representation of the video content.

In accordance with an embodiment, the method may further comprise determining the scaling factor based on a ratio of the display linear representation of the norm value for the first color gamut and the norm value of the three primary color values.

In accordance with an embodiment, the method may further comprise determining a first display linear representation of each of the three primary color values that describes the first color gamut based on the scaling factor and corresponding primary color value in the scene linear data.

In accordance with an embodiment, the method may further comprise determining a second display linear representation of each of the three primary color values in the display-based encoding color space based on the first display linear representation of the three primary color values that describes the first color gamut.

In accordance with an embodiment, the method may further comprise generating a video signal based on gamma correction on the second display linear representation of each of the three primary color values in the display-based encoding color space. The gamma correction on the second display linear representation of each of the three primary color values in the display-based encoding color space results in display non-linear representation of each of the three primary color values in the display-based encoding color space.

In accordance with an embodiment, the method may further comprise communicating the generated video signal, as the SDR video content, to an SDR video display.

Various embodiments of the disclosure may provide a computer readable medium, such as the non-transitory computer readable medium 506, having stored thereon, computer implemented instruction that when executed by the one or more hardware processors 504 causes the production server 118 to execute operations for generating video content with hue-preservation in virtual production. The one or more hardware processors 504 further causes the production server 118 to execute operations for determining data in a scene-based encoding format based on raw data received in a pre-defined format. The raw data may include a computer-generated background rendered on the rendering panel 102 and the foreground object 106. The one or more hardware processors 504 further causes the production server 118 to execute operations for determining scene linear data based on the data in the scene-based encoding format. The one or more hardware processors 504 further causes the production server 118 to execute operations for controlling saturation of the scene linear data when a first color gamut corresponding to the pre-defined format is mapped to a second color gamut corresponding to a display-based encoding color space. The first color gamut may be wider than the second color gamut. The one or more hardware processors 504 further causes the production server 118 to execute operations for determining an SDR video content in the display-based encoding color space based on the scene linear data. The hue of the SDR video content is preserved, when the rendering panel 102 is in-focus or out-of-focus, based on a scaling factor that is applied to three primary color values that describe the first color gamut.

Existing systems implement rendering transforms in rendering color pipelines that do not preserve hue when a rendering panel, such as LED wall, is out-of-focus or in-focus, thus ending up in surprising and non-intuitive results. For example, the hue of the LED wall is cyan when the LED wall is out-of-focus and blue when the rendering panel is in-focus.

The proposed system and method in the disclosure is advantageous as it preserves hue due to color balancing when the rendering panel is out-of-focus or in-focus. Thus, same color is reproduced for the rendering panel 102 whether the rendering panel 102 is out-of-focus or in-focus. Another benefit is that same colors from the scene are reproduced in the generated video signal. Thus, the result is intuitive that provides a natural and an enriching viewing experience.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein may be performed by specific circuits (e.g., application specific integrated circuits (ASICs)), by program instructions being executed by one or more processors, or by a combination of both. Additionally, these sequences of actions described herein may be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in several different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the operations as described herein for generating video content with hue-preservation in virtual production.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device, such as a virtual servers or container, or any other form of storage medium known in the art. An exemplary storage medium is communicatively coupled to the processor (including logic/code executing in the processor) such that the processor may read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
   memory for storing instructions; and
   a processor configured to execute the instructions, and based on the executed instructions, the processor is further configured to:
   determine data in a scene-based encoding format based on raw data received in a pre-defined format,
   wherein the raw data includes a computer-generated background rendered on a rendering panel and a foreground object;
   determine scene linear data based on the data in the scene-based encoding format;
   control a saturation of the scene linear data when a first color gamut corresponding to the pre-defined format is mapped to a second color gamut corresponding to a display-based encoding color space; and
   determine a standard dynamic range (SDR) video content in the display-based encoding color space based on the scene linear data,
   wherein hue of the SDR video content is preserved, when the rendering panel is in-focus or out-of-focus, based on a scaling factor that is applied to three primary color values that describe the first color gamut.

2. The system according to claim 1, wherein the processor is further configured to determine a norm value of the three primary color values based on a mathematical function applied on the three primary color values in the scene linear data.

3. The system according to claim 2, wherein the mathematical function corresponds to one of a maximum of the three primary color values, a linear average value of the three primary color values, a weighted average value of the three primary color values with approximate luminance weights for the first color gamut, or power cube over square of the three primary color values.

4. The system according to claim 2, wherein the processor is further configured to determine a display linear representation of the norm value for the first color gamut based on a tonemap of the norm value of the three primary color values.

5. The system according to claim 4, wherein the tonemap is a function that renders the scene linear data into an SDR display linear representation of the video content.

6. The system according to claim 4, wherein the processor is further configured to determine the scaling factor based on a ratio of the display linear representation of the norm value for the first color gamut and the norm value of the three primary color values.

7. The system according to claim 6, wherein the processor is further configured to determine a first display linear representation of each of the three primary color values that describes the first color gamut based on the scaling factor and corresponding primary color value in the scene linear data.

8. The system according to claim 7, wherein the processor is further configured to determine a second display linear representation of each of the three primary color values in the display-based encoding color space based on the first display linear representation of the three primary color values that describes the first color gamut.

9. The system according to claim 8, wherein the processor is further configured to:
   generate a video signal based on a gamma correction on the second display linear representation of each of the three primary color values in the display-based encoding color space,
   wherein the gamma correction on the second display linear representation of each of the three primary color values in the display-based encoding color space results in display non-linear representation of each of the three primary color values in the display-based encoding color space; and
   communicate the video signal, as the SDR video content, to an SDR video display.

10. The system according to claim 1, wherein the first color gamut is wider than the second color gamut.

11. A method, comprising:
- determining, by a processor, data in a scene-based encoding format based on raw data received in a pre-defined format,
    - wherein the raw data includes a computer-generated background rendered on a rendering panel and a foreground object;
- determining, by the processor, scene linear data based on the data in the scene-based encoding format;
- controlling, by the processor, a saturation of the scene linear data when a first color gamut corresponding to the pre-defined format is mapped to a second color gamut corresponding to a display-based encoding color space; and
- determining, by the processor, a standard dynamic range (SDR) video content in the display-based encoding color space based on the scene linear data,
    - wherein hue of the SDR video content is preserved, when the rendering panel is in-focus or out-of-focus, based on a scaling factor that is applied to three primary color values that describe the first color gamut.

12. The method according to claim 11, further comprising determining, by the processor, a norm value of the three primary color values based on a mathematical function applied on the three primary color values in the scene linear data.

13. The method according to claim 12, wherein the mathematical function corresponds to one of a maximum of the three primary color values, a linear average value of the three primary color values, a weighted average value of the three primary color values with approximate luminance weights for the first color gamut, or power cube over square of the three primary color values.

14. The method according to claim 12, further comprising determining, by the processor, a display linear representation of the norm value for the first color gamut based on a tonemap of the norm value of the three primary color values.

15. The method according to claim 14, wherein the tonemap is a function that renders the scene linear data into an SDR display linear representation of the video content.

16. The method according to claim 14, further comprising determining, by the processor, the scaling factor based on a ratio of the display linear representation of the norm value for the first color gamut and the norm value of the three primary color values.

17. The method according to claim 16, further comprising determining, by the processor, a first display linear representation of each of the three primary color values that describes the first color gamut based on the scaling factor and corresponding primary color value in the scene linear data.

18. The method according to claim 17, further comprising determining, by the processor, a second display linear representation of each of the three primary color values in the display-based encoding color space based on the first display linear representation of the three primary color values that describes the first color gamut.

19. The method according to claim 18, further comprising:
- generating, by the processor, a video signal based on a gamma correction on the second display linear representation of each of the three primary color values in the display-based encoding color space,
    - wherein the gamma correction on the second display linear representation of each of the three primary color values in the display-based encoding color space results in display non-linear representation of each of the three primary color values in the display-based encoding color space; and
- communicating, by the processor, the video signal, as the SDR video content, to an SDR video display.

20. A non-transitory computer readable medium, having stored thereon, computer executable code, which when executed by a processor, cause the processor to execute operations, the operations comprising:
- determining data in a scene-based encoding format based on raw data received in a pre-defined format,
    - wherein the raw data includes a computer-generated background rendered on a rendering panel and a foreground object;
- determining scene linear data based on the data in the scene-based encoding format;
- controlling a saturation of the scene linear data when a first color gamut corresponding to the pre-defined format is mapped to a second color gamut corresponding to a display-based encoding color space; and
- determining a standard dynamic range (SDR) video content in the display-based encoding color space based on the scene linear data,
    - wherein hue of the SDR video content is preserved, when the rendering panel is in-focus or out-of-focus, based on a scaling factor that is applied to three primary color values that describe the first color gamut.

\* \* \* \* \*